UNITED STATES PATENT OFFICE.

EMIL COLLETT, OF CHRISTIANIA, NORWAY, ASSIGNOR TO NORSK HYDRO-ELEKTRISK KVAELSTOFAKTIESELSKAB, OF CHRISTIANIA, NORWAY.

PROCESS OF OBTAINING NITRATES AND NITRITES FROM NITRATE-NITRITE MIXTURES.

1,110,481.  Specification of Letters Patent.  Patented Sept. 15, 1914.

No Drawing.   Application filed February 9, 1911. Serial No. 607,614.

*To all whom it may concern:*

Be it known that I, EMIL COLLETT, a subject of the King of Norway, residing at Christiania, Norway, have invented certain new and useful Improvements in Processes of Obtaining Nitrates and Nitrites from Nitrate-Nitrite-Mixtures; and I do hereby declare the following to be a full, clear, and exact description of the invention, such as will enable others skilled in the art to which it appertains to make and use the same.

This invention relates to the treatment of mixtures containing nitrites and nitrates, and has for its object a process of manufacturing pure nitrites and pure nitrates from such mixtures.

In the manufacture of nitrites, a mixture of nitrate and nitrite is usually obtained besides the pure nitrite desired. To completely separate the components of said mixture is a very difficult problem, and many experiments have been made for the purpose of utilizing such nitrate-nitrite-mixtures. Thus it has been proposed to transform the entire mixture into nitrate by treating the mixture with nitric acid and thereupon transforming the nitrous gases so obtained into nitric acid, which is again employed together with other nitric acid for the purpose of decomposing fresh amounts of the nitrate-nitrite mixture.

This process works smoothly and is very useful when the nitrites in question are in themselves of little use or value. The case is however quite different, when said substance is a mixture of nitrates, and more valuable nitrites for instance of nitrites of sodium. As is well known nitrite of sodium is a product for which there is a great demand in various industries, the value of said product, by reason of its high content of nitrogen, being much greater than that of nitrate of sodium. Owing to this fact it would be an irrational mode of procedure to transform a nitrate-nitrite of sodium mixture into pure nitrate. Now according to this invention it is possible in a practical manner to obtain pure nitrate and pure nitrite from a mixture of these substances; this is done by first treating the mixture with nitric acid and thereupon absorbing the nitrous gases formed hereby in a suitable absorbent, care being taken that no oxygen or only a limited quantity of oxygen is introduced into said gases before their absorption.

By the action of nitric acid upon a nitrite nitrate mixture various oxids of nitrogen are formed. If these oxids were in the usual manner mixed with such a quantity of oxygen or air as to be completely oxidized into nitrogen pentoxid and subsequently absorbed in water or aqueous solutions, only nitric acid or nitrates would be obtained, and thus the whole amount of the nitrogen of the nitrite would be transformed into nitric oxid, which as above stated would in certain cases be an irrational mode of procedure.

It has now been proved by experiments that if oxygen for instance in the form of air is not introduced at all or only in a certain limited quantity into the nitrous gases formed by said nitric acid treatment, and if an alkali or alkaline earth is employed as an absorbent, for instance as a solution or suspension, then the nitrogen absorbed will be fixed exclusively in the form of nitrite.

One hundred kgs. of nitrate-nitrite mixture containing for example—50 per cent. of nitrite of sodium, 45 per cent. of nitrate of sodium, 3 per cent. of chlorid of sodium, 2 per cent. of water, is dissolved in 250 kg. of water. To the solution so obtained 100 kg. of 31 per cent. nitric acid is added; the solution and acid being preferably passed through an acid tower filled with quartz over which both solution and acid flow. In this manner the nitric oxid evolved will escape from the tower so that the resulting nitrate solution will contain a very small amount of nitrogen oxids. The nitrate solution is neutralized and evaporated to obtain nitrate. In the present example 300 kg. of solution containing about 95 kg. of nitrate.

In the case of a nitrite-nitrate mixture of the above composition being treated, the gas evolved during the treatment will consist only of pure nitric oxid (NO) and in the present example about 14.50 kg.

To obtain nitrous acid, oxygen must be added according to the following equation $$4NO + O_2 = 2N_2O_3$$

Thus, in the present example 3.86 kg. of oxygen must be used, or if air in normal condition is used 12.93 cubic meters will be necessary.

After mixing the nitrous oxid with air or oxygen, the gas is absorbed in a cold concentrated solution of carbonate of sodium, forming nitrite, and in the present case the whole amount of gas is absorbed as nitrite.

It will be apparent from the example that an excess of NO will be formed, to which only sufficient oxygen is added to form nitrous acid, there being always an excess of nitric oxid present.

In this manner there is obtained from the nitrite-nitrate mixture on one hand a pure nitrate resulting from treating the mixture with nitric acid and on the other hand a pure nitrite formed by absorbing the resulting nitrous gases in an alkaline absorbent.

What I claim is:

1. The process of producing nitrates and nitrites from a nitrite-nitrate mixture which comprises, treating said mixture with nitric acid, adding to the evolved gas a limited quantity of oxygen sufficient to oxidize the nitric oxid of said gas to nitrogen trioxid, and absorbing the resulting gas in an alkaline absorbent.

2. The process of producing pure nitrite and pure nitrate from a nitrite-nitrate mixture by treating the mixture with nitric acid to obtain nitrous gases and a residuum consisting of pure nitrate which comprises, mixing said nitrous gases with a limited amount of oxygen in the form of air, and absorbing the gas mixture in an alkaline absorbent, the oxygen content of said gases being so regulated as to provide for the combining of said nitrous gases with the absorbent to form nitrite only.

In testimony that I claim the foregoing as my invention, I have signed my name in presence of two subscribing witnesses.

EMIL COLLETT.

Witnesses:
NANA PEDERSON,
HENRY BORDEWICH.